United States Patent
Bright et al.

(10) Patent No.: US 7,204,085 B2
(45) Date of Patent: Apr. 17, 2007

(54) POWER SOURCE DERATING COMPONENT PROTECTION SYSTEM

(75) Inventors: Christopher Erik Bright, Raleigh, NC (US); Gregory August Epplin, Apex, NC (US); William Christopher Swick, Raleigh, NC (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/925,908

(22) Filed: Aug. 26, 2004

(65) Prior Publication Data

US 2006/0042241 A1 Mar. 2, 2006

(51) Int. Cl.
*F16P 7/00* (2006.01)
*F16D 31/02* (2006.01)
(52) U.S. Cl. .......................... 60/423; 60/452
(58) Field of Classification Search .................. 60/329, 60/423, 431, 452
See application file for complete search history.

(56) References Cited

U.S. PATENT DOCUMENTS

| | | | |
|---|---|---|---|
| 4,506,638 A | 3/1985 | Horii et al. | |
| 4,815,340 A | 3/1989 | Iwatsuki et al. | |
| 4,998,519 A | 3/1991 | Kobayashi | |
| 5,070,832 A | 12/1991 | Hapka et al. | |
| 5,155,996 A * | 10/1992 | Tatsumi et al. | 60/452 |
| 5,251,440 A * | 10/1993 | Bong-dong et al. | 60/329 |
| 5,315,972 A | 5/1994 | Judy et al. | |
| 5,343,780 A | 9/1994 | McDaniel et al. | |
| 5,559,703 A | 9/1996 | Iwata et al. | |
| 5,561,602 A | 10/1996 | Bessler et al. | |
| 5,576,961 A | 11/1996 | Genzel et al. | |
| 5,699,335 A | 12/1997 | Joo et al. | |
| 5,730,103 A | 3/1998 | Takizawa et al. | |
| 5,878,557 A | 3/1999 | Wyffels et al. | |
| 5,921,220 A | 7/1999 | Kato | |
| 5,954,617 A | 9/1999 | Horgan et al. | |
| 6,131,539 A | 10/2000 | Thomas | |
| 6,247,441 B1 | 6/2001 | Sato et al. | |
| 6,253,136 B1 | 6/2001 | Stratton et al. | |
| 6,306,063 B1 | 10/2001 | Horgan et al. | |
| 6,363,315 B1 | 3/2002 | Love et al. | |
| 6,389,808 B1 * | 5/2002 | Sakai | 60/329 |
| 6,415,761 B1 | 7/2002 | McKenzie | |
| 6,529,077 B1 | 3/2003 | Morikami | |
| 6,529,815 B2 | 3/2003 | Hawkins et al. | |
| 6,536,402 B2 | 3/2003 | Houchin et al. | |
| 6,712,651 B2 | 3/2004 | Kanno | |

(Continued)

OTHER PUBLICATIONS

Product information flyer, "VHSS - Volvo Hydraulic Safeguard System - BL71," Backhoe Loader No. 02/2002, 1 page, Nov. 14, 2002.

*Primary Examiner*—Thomas E. Lazo
(74) *Attorney, Agent, or Firm*—Finnegan, Henderson, Farabow, Garrett & Dunner; Deric J. Barnes

(57) ABSTRACT

A protection system is provided for a work machine with a power source. At least one sensor is configured to monitor a fluid parameter of a work machine system external to the power source. The sensor is further configured to produce a signal indicative of a value of the fluid parameter. The component protection system has a control module in communication with the at least one sensor, the control module being configured to derate a power source output base upon the value of the fluid parameter.

31 Claims, 2 Drawing Sheets

U.S. PATENT DOCUMENTS 6,789,000 B1 * 9/2004 Munson, Jr. ................ 700/287
6,923,158 B2 * 8/2005 Kang et al. ................ 123/396
2004/0064231 A1 4/2004 Oohori et al.
2005/0150143 A1 7/2005 Charles

* cited by examiner

POWER SOURCE DERATING COMPONENT PROTECTION SYSTEM

TECHNICAL FIELD

The present disclosure relates generally to a component protection system and, more particularly, to a component protection system that implements power source derating.

BACKGROUND

A work machine may include many different fluid systems having multiple components within each system. Although single component failures within the various systems may not be completely preventable, continued operation of the work machine under component failure conditions could result in complete fluid system failure. Engine protection systems have been implemented that monitor engine fluid conditions and implement routines to protect the engine when the fluid conditions of the engine are not within acceptable ranges.

One such protection system is described in U.S. Pat. No. 5,070,832 (the '832 patent) to Hapke et al. The '832 patent teaches an engine protection system that monitors various engine fluid parameters and compares the parameters to limit values. If a fluid fault condition exists, the engine performance is derated to prevent catastrophic failure of the engine.

Although the engine protection system of the '832 patent may protect the engine of a work machine when the engine fluid operating conditions exceed acceptable limits, it may do nothing to protect work machine systems that are external to the engine. In particular, because the fluid conditions monitored by the engine protection system of the '832 patent are not related to fluid conditions of work machine systems external to the engine, these external systems may continue to operate to the point of complete system failure after a single component malfunction without detection of a fluid condition abnormality and/or intervention by the engine protection system.

The disclosed component protection system is directed to overcoming one or more of the problems set forth above.

SUMMARY OF THE INVENTION

In one aspect, the present disclosure is directed to a component protection system for a work machine that has a power source. The component protection system includes at least one sensor configured to monitor a fluid parameter of a work machine system external to the power source and to produce a signal indicative of a value of the fluid parameter. The component protection system also includes a control module in communication with the at least one sensor, the control module being configured to derate a power source output based upon the value of the fluid parameter.

In another aspect, the present disclosure is directed to a method of protecting a work machine system external to a work machine power source. The method includes monitoring a fluid parameter associated with the work machine system and derating an output of the work machine power source base upon a value of the fluid parameter.

DETAILED DESCRIPTION

Figure 1:
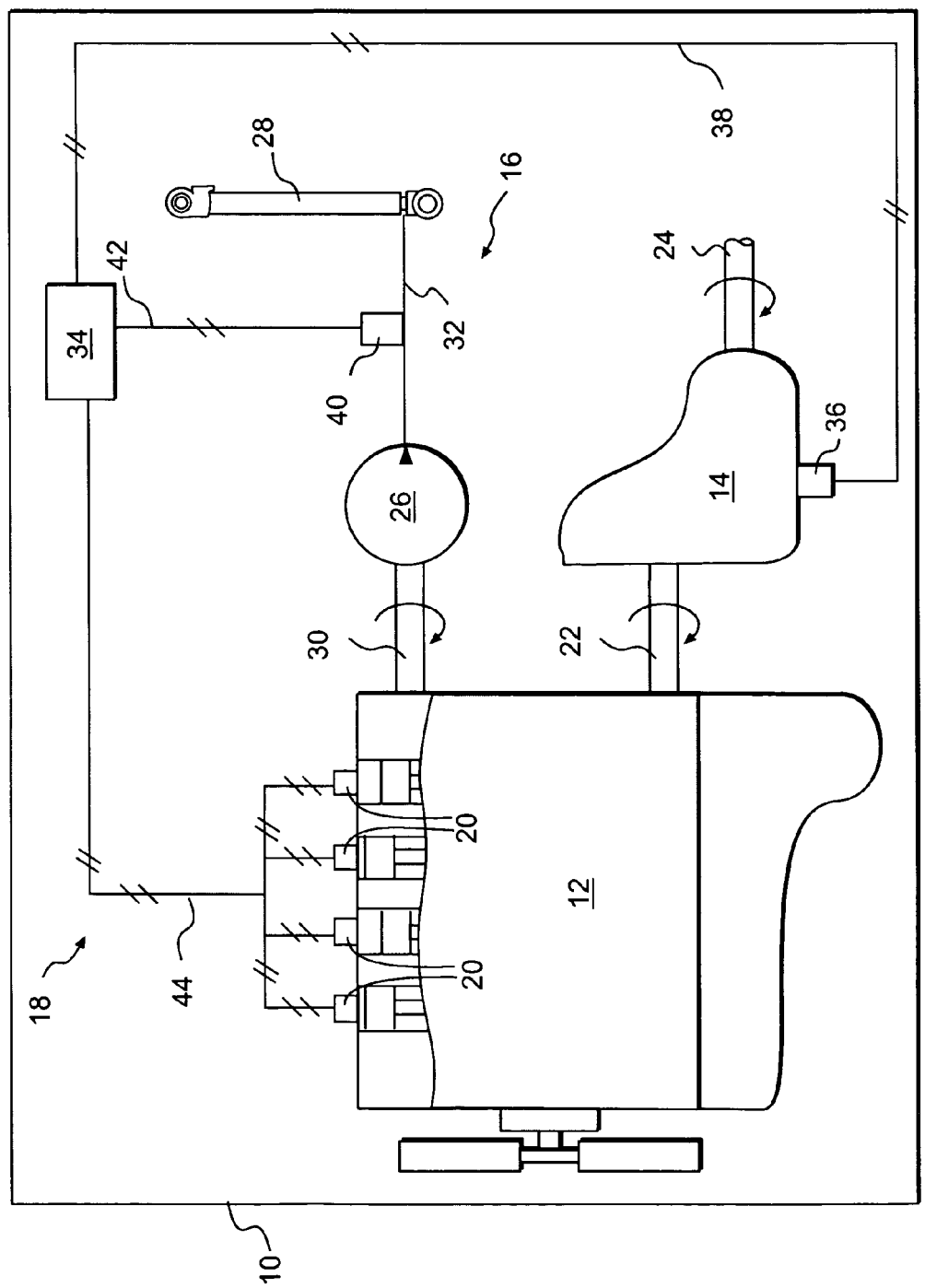
FIG. 1 is a diagrammatic illustration of an exemplary disclosed component protection system.

FIG. 1 illustrates an exemplary work machine 10. Work machine 10 may be a fixed or mobile machine that performs some type of operation associated with an industry such as mining, construction, farming, transportation, or any other industry known in the art. For example, work machine 10 may be an earth moving machine such as a dozer, a loader, an excavator, a motor grader, a dump truck, or any other earth moving machine. Work machine 10 may alternately be a generator set, a pump, a marine vessel, a passenger vehicle, or any other suitable operation-performing work machine. Work machine 10 may include a power source 12, a transmission 14, a hydraulic system 16, and a component protection system 18.

Power source 12 may include an internal combustion engine such as, for example, a diesel engine, a gasoline engine, a natural gas engine, or any other engine apparent to one skilled in the art. Power source 12 may, alternately, include another source of power such as a furnace, a battery, a fuel cell, or any other source of power known in the art. In one embodiment, power source 12 may be a four cylinder diesel engine having one fuel injector 20 per cylinder. It is contemplated that power source 12 may have a greater or lesser number of cylinders and/or a different number of fuel injectors 20 per cylinder.

Transmission 14 may be configured to transmit power from power source 12 to an output device (not shown) at a range of output speed ratios. Transmission 14 may be a hydraulic transmission, a mechanical transmission, a hydro-mechanical transmission, or any other suitable transmission. The output device may include such devices as a ground engaging device, a pump, a generator, a propeller, or any other output device known in the art. An input drive member such as, for example, a countershaft 22, may connect power source 12 to transmission 14. Transmission 14 may also include an output driven member such as, for example, an output shaft 24 connecting transmission 14 to the output device. In this manner, power generated by power source 12 may be transmitted through output shaft 24 to the output device. It is contemplated that transmission 14 may alternately transmit power from power source 12 to the output device at only a single output speed ratio.

Hydraulic system 16 may include components configured to hydraulically transfer power from power source 12 to one or more work tools (not shown) in response to an operator input. Specifically, hydraulic system 16 may include a pump 26 configured to pressurize a fluid directed to one or more hydraulic cylinders 28.

Pump 26 may be a variable displacement pump, a fixed displacement pump, a variable flow pump, or any other source of pressurized fluid known in the art. Pump 26 may be drivably connected to power source 12 via an input drive member such as, for example, a countershaft 30. Pump 26 may convert an input rotation of countershaft 30 into an output of pressurized fluid. In this manner, mechanical power generated by power source 12 may be converted to fluid power.

Hydraulic cylinder 28 may be fluidly connected to pump 26 via a fluid passageway 32 and may function to actuate the work tool. In particular, hydraulic cylinder 28 may be supplied with the pressurized fluid from pump 26 to cause a piston assembly (not shown) within hydraulic cylinder 28 to displace within a tube (not shown) of hydraulic cylinder 28, thereby increasing an effective length of hydraulic cylinder 28. Hydraulic cylinder 28 may also be connected to a fluid drain (not shown) to cause the piston assembly to displace within the tube to decrease the effective length of hydraulic cylinder 28. In this manner, the expansion and retraction of hydraulic cylinder 28 may convert the fluid power from pump 26 to mechanical power that assists the movement of the work tool. It is contemplated that hydraulic cylinder 28 may be omitted, if desired, and a different hydraulic device may be fluidly coupled to pump 26.

Component protection system 18 may be in communication with transmission 14, hydraulic system 16, and power source 12. Specifically, component protection system 18 may include a control module 34 in communication with a transmission sensor 36 via a communication line 38, with a hydraulic system sensor 40 via a communication line 42, and with injectors 20 of power source 12 via a communication line 44.

Control module 34 may include a microprocessor with a means for storing and comparing information, and for controlling an operation of power source 12. Control module 34 may be embodied in a single microprocessor or multiple microprocessors. Numerous commercially available microprocessors can be configured to perform the functions of control module 34. It should be appreciated that control module 34 could readily be embodied in a general work machine microprocessor capable of controlling numerous work machine functions. Control module 34 may include any means for storing, comparing, and controlling such as a memory, one or more data storage devices, or any other components that may be used to run an application. Furthermore, although aspects of the present disclosure may be generally described as being stored in memory, one skilled in the art will appreciate that these aspects can be stored on or read from types of computer-related products or computer-readable media such as computer chips and secondary storage devices, including hard disks, floppy disks, optical media, CD-ROM, or other forms of RAM or ROM. Various other known circuits may be associated with control module 34, including power supply circuitry, signal-conditioning circuitry, solenoid driver circuitry, communication circuitry, and other appropriate circuitry.

Transmission sensor 36 may be configured to sense a fluid parameter of transmission 14 and to generate a signal having a value indicative of the fluid parameter. For example, transmission sensor 36 may be configured to sense a fluid parameter of a fluid provided to a clutch (not shown) within transmission 14, to sense a fluid parameter of a fluid within a sump (not shown) of transmission 14, to sense a fluid parameter of a fluid directed between a pump (not shown) and a motor (not shown) within transmission 14, or to sense a fluid parameter of any other suitable fluid within transmission 14. The fluid parameter sensed by transmission sensor 36 may include, for example, a pressure, a temperature, a viscosity, or any other transmission fluid parameter known in the art.

Hydraulic system sensor 40 may be configured to sense a parameter of the fluid directed between pump 26 and hydraulic cylinder 28 within hydraulic system 16, to sense a fluid parameter of a fluid within a sump (not shown) of hydraulic system 16, or to sense a fluid parameter of any other suitable fluid within hydraulic system 16. The fluid parameter sensed by hydraulic system sensor 40 may include, for example, a pressure, a temperature, a viscosity, or any other hydraulic system fluid parameter known in the art.

Control module 34 may configured to change an operation of power source 12. Operational changes of power source 12 may include derating an output of power source 12 such as, for example, an output torque and/or an output speed. Derating an output of power source 12 may include lowering a maximum output of power source 12 over an entire operating range of power source 12. For example, a maximum output torque may be lowered over a range of output speeds by changing fuel delivery characteristics of fuel injectors 20. Similarly, a maximum output speed may be lowered over a range of transmission output ratios. The fuel delivery characteristics available for modification may include a fuel delivery amount, a fuel delivery timing, and any other fuel delivery characteristics known in the art.

Control module 34 may change the operation of power source 12 in response to signals from transmission sensor 36 and/or hydraulic system sensor 40. By means of example, control module 34 may include a table of derate percent values stored in the memory of control module 34. As will be described in more detail in the following section, these derate percent values may be related to values of the signals produced by transmission sensor 36 and/or hydraulic system sensor 40. It is contemplated that the table may be omitted, if desired, and that control module 34 may alternately derate power source 12 based upon one or more predetermined equations as functions of the signal values from transmission sensor 36 and/or hydraulic system sensor 40.

Figure 2:
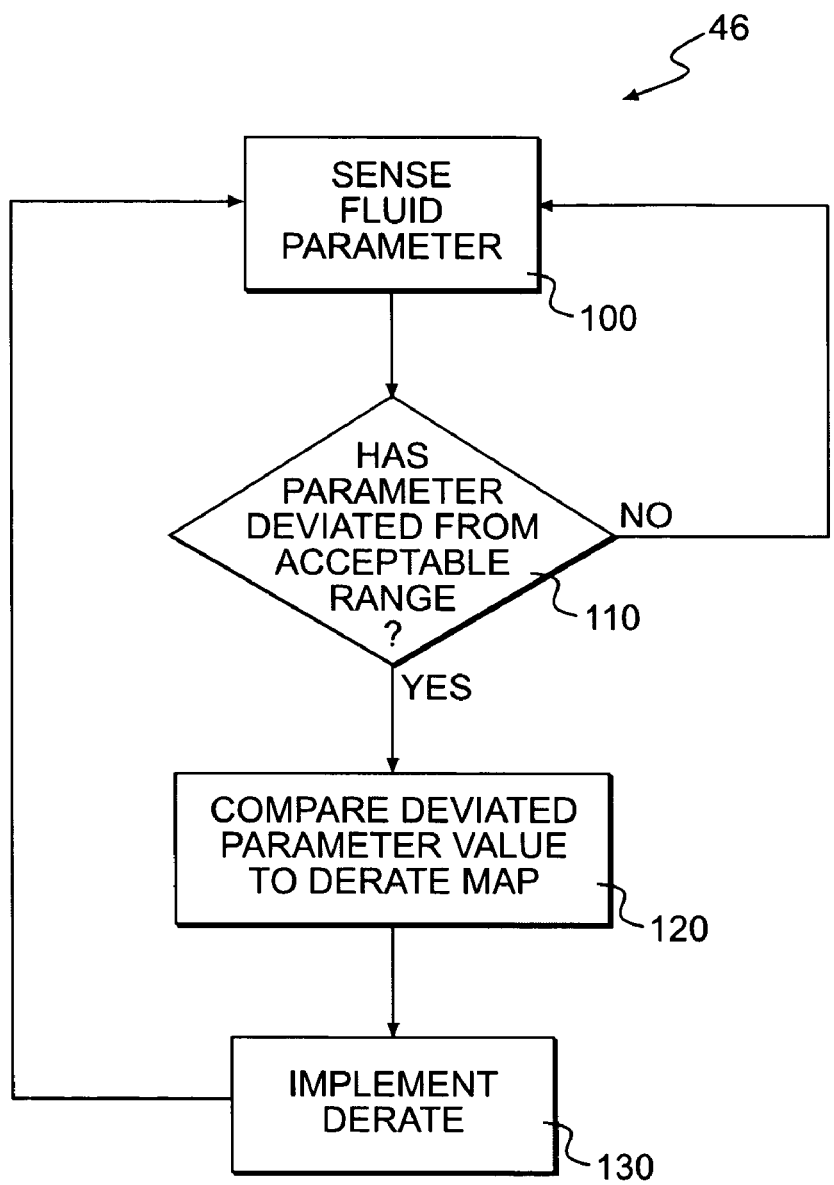
FIG. 2 is an exemplary process flow chart for the component protection system of FIG. 1.

FIG. 2 illustrates a flowchart 46 depicting an exemplary method for operating component protection system 18. Flowchart 46 will be described in further detail in the following section.

INDUSTRIAL APPLICABILITY

The disclosed component protection system finds potential application in any power system where it is desirable to protect components of a work machine auxiliary system that is external to a main power source and driven by the main power source. Specifically, when a sensed fluid parameter value of an auxiliary system is indicative of a component failure within the auxiliary system, an operation of the main power source may be controlled to prevent the power source from driving the auxiliary system to further detriment.

Referring to FIG. 2, when component protection system 18 is in operation, the value of one or more fluid parameters within transmission 14 and/or hydraulic system 16 may be continuously sensed and compared with predetermined acceptable ranges for the particular fluid parameters (step 100). It is also contemplated that the value of one or more fluid parameters within transmission 14 and/or hydraulic system 16 may be checked at predetermined time intervals. Component protection system 18 may then determine if the values of the fluid parameters are within the predetermined acceptable ranges (step 110). If the value of the fluid parameters are within the predetermined acceptable ranges, component protection system 18 may continue to sense the fluid parameters without changing an output of power source 12 (step 100).

However, if one or more of the fluid parameter values deviate from the predetermined acceptable ranges, the magnitude of the deviation may be quantified and compared to the derate table stored in the memory of control module 34 to determine an appropriate derate percent that will protect transmission 14 and/or hydraulic system 16 from further damage (step 120). The derate table may include specific derate percent values that correspond with specific parameter values. Appropriate derate percent values, which correspond with parameter values that are not listed in the table, may be determined through, for example, linearly interpolation or extrapolation. It is contemplated that the appropriate derate percents for parameter values not listed in the derate table may, alternately, be non-linearly interpolated or extrapolated according to one or more predetermined equations. It is further contemplated that all appropriate derate percents may be calculated using a desired formula.

Once the derate percent value has been determined, this value may be applied to power source 12 (step 130). As described above, the derate may be implemented by controlling a fuel injection quantity and/or fuel injection timing of injectors 20. It is contemplated that prior to derating operation of power source 12, a warning consisting of, for example, the actuation of a warning lamp and or a warning signal may be initiated when the values of the sensed parameters have exceeded the predetermined acceptable ranges, but have not yet exceeded a minimum derate threshold. During and after derate, control module 34 may continue to sense the fluid parameters of transmission 14 and/or hydraulic system 16 to determine if further action is required (step 100).

Regardless of the magnitude of deviation beyond the predetermined acceptable range, the maximum amount of derate may be limited to a maximum output under non-derated operation. In one example, the maximum amount of derate may be limited to a maximum derate of 50% of the power source maximum output. In this manner, sufficient power source output may be maintained that ensures safe operation of work machine 10 and/or that ensures the capability for the work machine 10 to return to a service bay for repair ("limp-home capacity").

Several advantages are realized because the operation of power source 12 may be changed in response to a sensed parameter of a fluid system external to power source 12. A minor component failure that can be cost-effectively repaired may be quickly brought to the attention of a work machine operator. In addition, automatic reduction of the power source driving force and/or speed that might otherwise contribute to system-wide failure, may result in the failed component have a limited damaging effect on the associated system.

It will be apparent to those skilled in the art that various modifications and variations can be made to the component protection system of the present disclosure. Other embodiments of the component protection system will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A protection system for a work machine having a power source, comprising:
    at least one sensor configured to monitor a fluid parameter of a work machine system external to the power source, and to produce a signal indicative of a value of the fluid parameter, wherein the work machine system is one of a hydraulic system that actuates at least one work tool and a transmission; and
    a control module in communication with the at least one sensor, the control module being configured to selectively derate a power source output based upon the value of the fluid parameter when the value of the fluid parameter is indicative of a component failure within the work machine.

2. The protection system of claim 1, wherein the work machine system is a transmission and the fluid parameter is a pressure of a fluid within the transmission.

3. The protection system of claim 1, wherein the work machine system is a transmission and the fluid parameter is a temperature of a fluid within the transmission.

4. The protection system of claim 1, wherein the work machine includes at least one work tool, the work machine system being a hydraulic system that actuates the at least one work tool and the fluid parameter is a pressure of a fluid within the hydraulic system.

5. The protection system of claim 1, wherein the work machine includes at least one work tool, the work machine system being a hydraulic system that actuates the at least one work tool and the fluid parameter is a temperature of a fluid within the hydraulic system.

6. The protection system of claim 1, wherein the output is a speed of the power source.

7. The protection system of claim 1, wherein the output is a torque of the power source.

8. The protection system of claim 1, wherein the output is deratable to a maximum derate of 50% of full output.

9. The protection system of claim 1, wherein the control module includes a map having a table of parameter values and corresponding desired derate values.

10. The protection system of claim 1, wherein the control module derates the output in response to the value being outside of a predetermined range.

11. The protection system of claim 1, wherein the control module is further configured to actuate a warning when the value of the fluid parameter exceeds a predetermined acceptable range, but has not yet exceeded a minimum derate threshold.

12. A method of protecting a work machine system external to a work machine power source, the method comprising:
    monitoring a fluid parameter associated with the work machine system, wherein the work machine system is one of a hydraulic system that actuates at least one work tool and a transmission; and
    derating an output of the work machine power source based upon a value of the fluid parameter when the value of the fluid parameter is indicative of a component failure within the work machine.

13. The method of claim 12, wherein the work machine system is a transmission and monitoring a fluid parameter includes monitoring a pressure of a fluid within the transmission.

14. The method of claim 12, wherein the work machine system is a transmission and monitoring a fluid parameter includes monitoring a temperature of a fluid within the transmission.

15. The method of claim 12, wherein the work machine includes at least one work tool, the work machine system being a hydraulic system that actuates the at least one work tool and monitoring a fluid parameter includes monitoring a pressure within the hydraulic system.

16. The method of claim 12, wherein the work machine includes at least one work tool, the work machine system being a hydraulic system that actuates the at least one work tool and monitoring a fluid parameter includes monitoring a temperature within the hydraulic system.

17. The method of claim 12, wherein derating an output includes derating a speed of the power source.

18. The method of claim 12, wherein derating an output includes derating a torque of the power source.

19. The method of claim 12, wherein derating the output is in response to the value being outside of a predetermined range.

20. The method of claim 12, wherein derating the output includes derating the output to a maximum derate of 50% of full output.

21. The method of claim 12, further including:
comparing the value of the fluid parameter to a derate map stored in a memory of a control module associated with the work machine; and
derating the output according to a relationship of the value of the fluid parameter and a derate value.

22. The method of claim 12, further including actuating a warning when the value of the fluid parameter exceeds a predetermined acceptable range, but has not yet exceeded a minimum derate threshold.

23. A work machine, comprising:
a power source;
a fluid system external to the power source and drivably connected to the power source; and
a protection system having:
at least one sensor configured to monitor a fluid parameter of a work machine system external to the power source and to produce a signal indicative of a value of the fluid parameter, wherein the work machine system is one of a hydraulic system that actuates at least one work tool and a transmission;
a control module in communication with the at least one sensor, the control module being configured to selectively derate a power source output based upon the value of the fluid parameter when the value of the fluid parameter is indicative of a component failure within the work machine.

24. The work machine of claim 23, wherein the work machine system is a transmission and the fluid parameter is at least one of a pressure and a temperature of a fluid within the transmission.

25. The work machine of claim 23, wherein the work machine includes at least one work tool, the work machine system being a hydraulic system that actuates the at least one work tool, and the fluid parameter is a pressure of a fluid within the hydraulic system.

26. The work machine of claim 23, wherein the work machine includes at least one work tool, the work machine system being a hydraulic system that actuates the at least one work tool, and the fluid parameter is a temperature of a fluid within the hydraulic system.

27. The work machine of claim 23, wherein the output is at least one of a speed and a torque of the power source.

28. The work machine of claim 23, wherein the output is derated to a maximum derate of 50% of full output.

29. The work machine of claim 23, wherein the control module includes a map having a table of parameter values and corresponding desired derate values.

30. The work machine of claim 23, wherein the control module derates the output in response to the value being outside of a predetermined range.

31. The work machine of claim 23, wherein the control module is further configured to actuate a warning when the value of the fluid parameter exceeds a predetermined acceptable range, but has not yet exceeded a minimum derate threshold.

* * * * *